Figure 7:
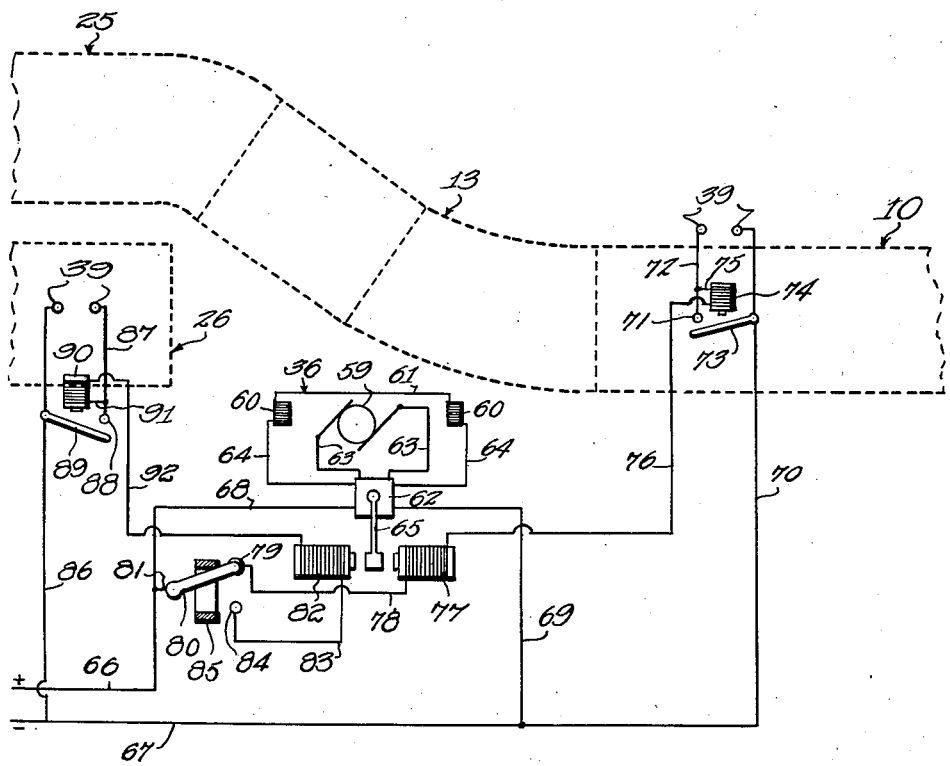

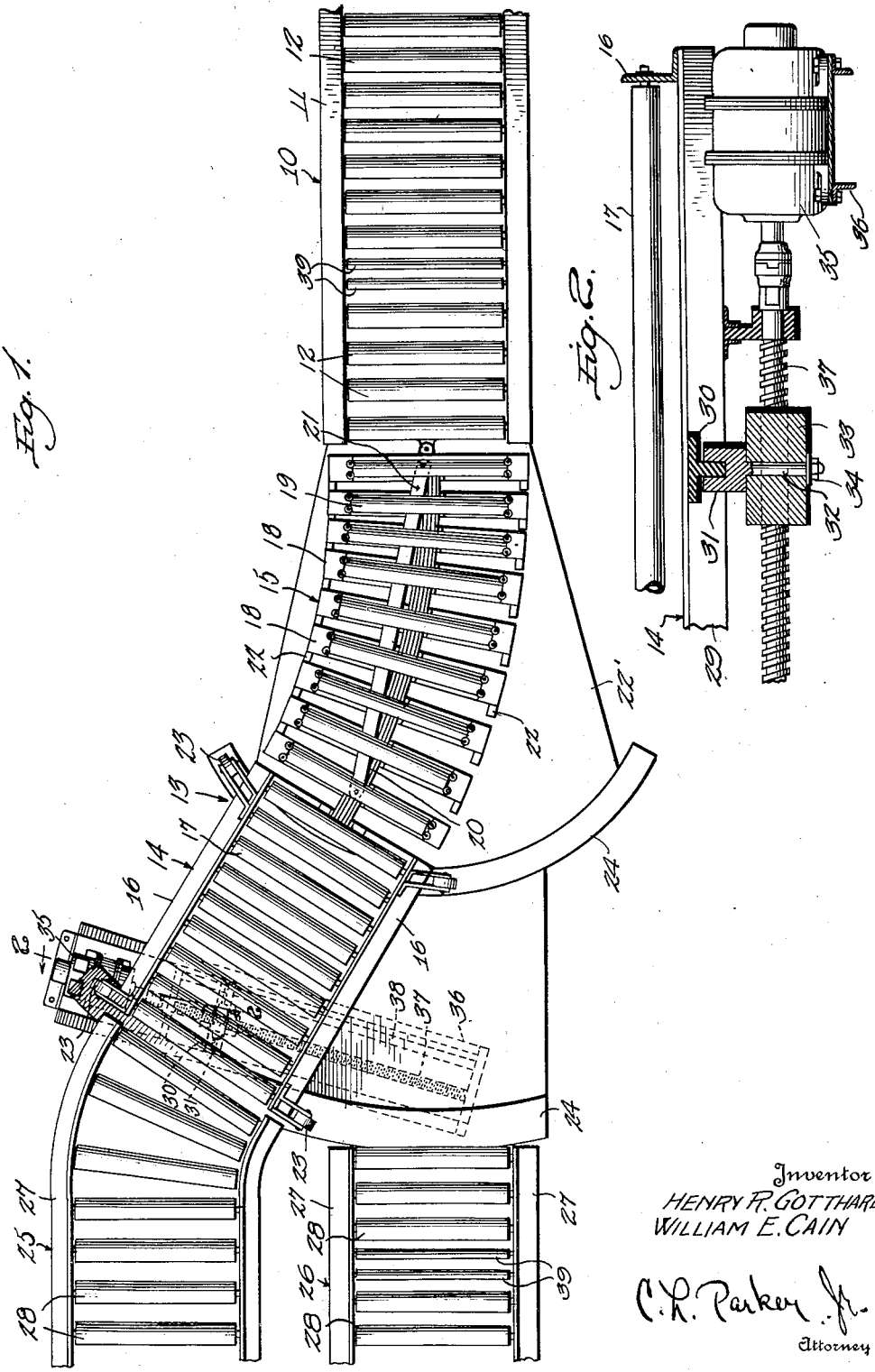

June 2, 1931.  H. R. GOTTHARDT ET AL  1,808,134
SELECTIVE DEFLECTING SWITCH
Filed Sept. 25, 1929  4 Sheets-Sheet 2
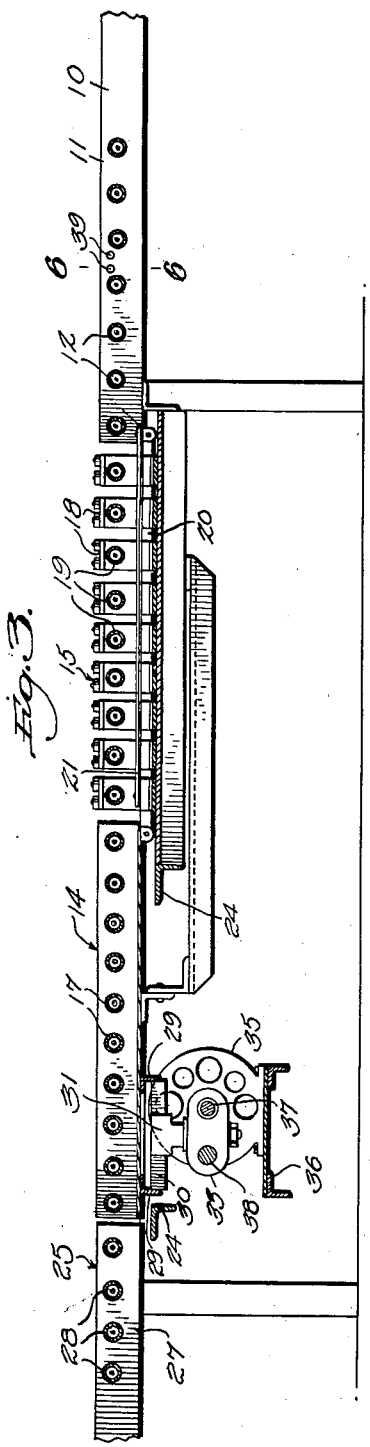
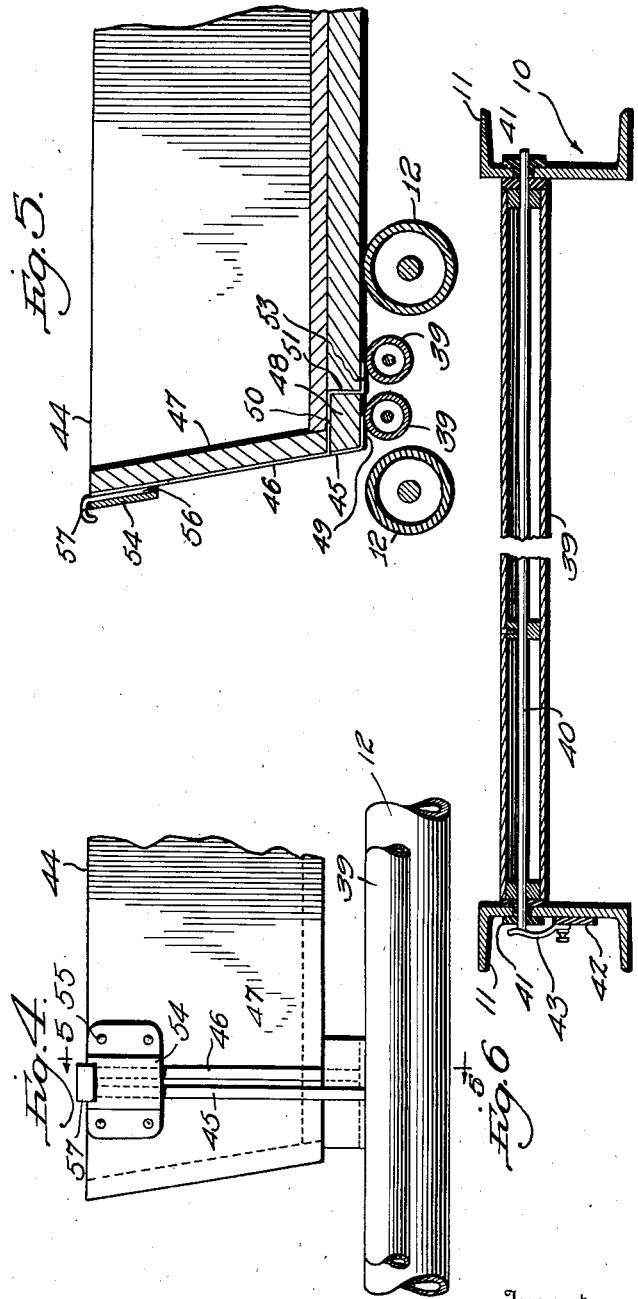
Inventor
HENRY R. GOTTHARDT
WILLIAM E. CAIN
By C. L. Parker Jr.
Attorney June 2, 1931.  H. R. GOTTHARDT ET AL  1,808,134
SELECTIVE DEFLECTING SWITCH
Filed Sept. 25, 1929   4 Sheets-Sheet 4
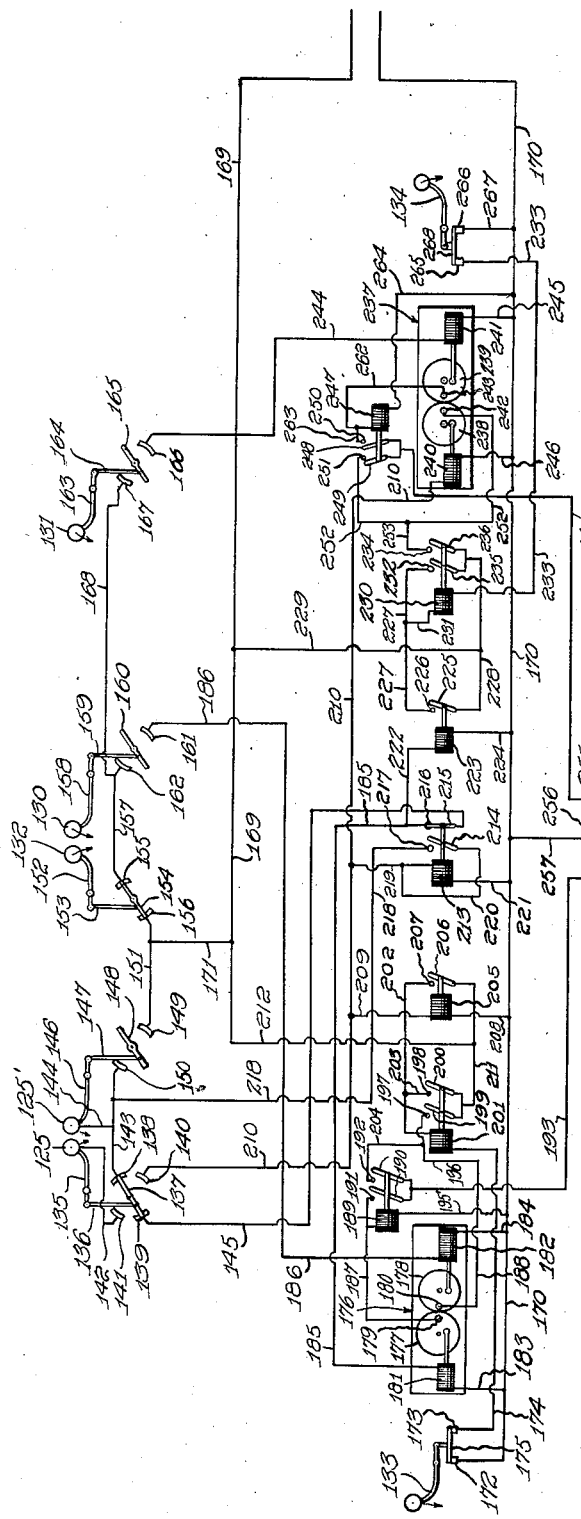
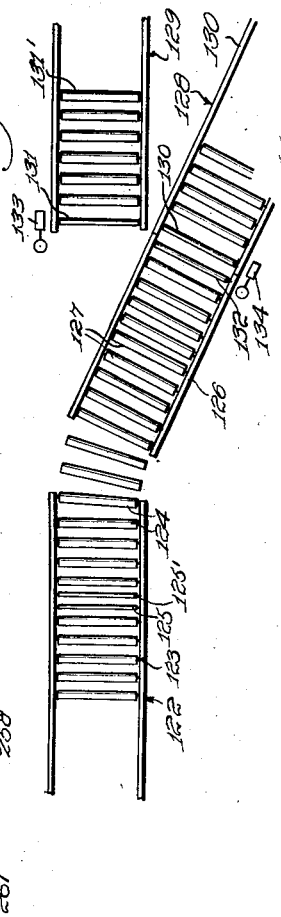
Inventor
HENRY R. GOTTHARDT
WILLIAM E. CAIN
C. L. Parker Jr.
Attorney Patented June 2, 1931

1,808,134

UNITED STATES PATENT OFFICE

HENRY R. GOTTHARDT, OF LOUISVILLE, KENTUCKY, AND WILLIAM E. CAIN, OF JEFFERSONVILLE, INDIANA, ASSIGNORS TO LOGAN CO., INC., OF LOUISVILLE, KENTUCKY, A CORPORATION OF KENTUCKY

SELECTIVE DEFLECTING SWITCH

Application filed September 25, 1929. Serial No. 395,167.

This invention relates to selective deflecting switches, and more particularly to a conveyor having automatically operable means associated therewith for transferring articles from a main conveyor to either of a plurality of branch conveyors.

Heretofore, a number of operative automatic switching conveyors have been developed which were operable for discharging articles from selected points along a main conveyor to branch conveyors. Most of the devices of this character embody the use of an elongated unbroken main conveyor, and the switching means usually is in the form of a deflector adapted to extend angularly across the main conveyor to cause articles to be discharged therefrom by dragging the articles transversely of the main conveyor.

Switching conveyors of the character referred to have been developed for automatic operation, and the deflectors usually are controlled by trip or similar mechanisms adapted to contact with upward projections carried by the articles themselves. For example, when it is desired to discharge an article from the main conveyor at a given branch point, the article is provided with an upward projection which is adapted to operate the trip or other mechanism associated with the deflector arranged at the particular point at which it is desired to discharge the article to a branch conveyor.

Switching conveyors of the character referred to above are open to a number of objections. For example, it is necessary to provide positive power driven means in the main conveyor line at the point where the packages are deflected as it is impossible to deflect the articles or packages by dragging them sideways from a gravity or roller conveyor. It also will be obvious that in the use of conveyors of the character referred to, the movement of the articles at an angle to the direction of travel of the conveyor causes excessive friction and wear between the power driven conveyor and the package and excess thrust on the power conveyor.

It also will be noted that packages, to be successfully deflected by the means referred to, must be of the same size or dimensions within reasonable limits, and must be held reasonably straight on the conveyor, otherwise the selecting devices carried by the packages will not properly actuate the deflecting means.

In the copending applications of Allen E. Crady for conveyors, Serial No. 188,781, filed May 4, 1927, and Carl W. Resch for switching conveyors, Serial No. 359,897, filed May 2, 1929, there are disclosed novel forms of switching means which are particularly adapted for used in connection with gravity conveyors, and wherein the angular movement of articles with respect to the conveyor while being transferred to branch lines is eliminated. These devices employ, as a part of the switching means, a plurality of individual conveyor rollers which are adapted to be moved in such a manner as to cause them to assume radial positions with respect to a common center to facilitate the movement of the articles from the main conveyor to either of a plurality of branch conveyors.

The present invention particularly relates to conveyors of the general type disclosed in the copending applications referred to, and has for its principal object the provision of means adapted to be automatically actuated for swinging the switch section to either of a plurality of selected positions.

A further object is to provide an automatic switching conveyor of the character referred to having electrical means associated with a certain class of articles moving along the conveyor for determining the destinations thereof.

A further object is to provide novel means whereby articles of a certain class traveling on the conveyor are adapted to close control circuits for swinging the switching conveyor to change the normal destination of the articles.

A further object is to provide a device of the character just mentioned wherein movement of an article from the switching conveyor to a branch line other than the normal line is operative for restoring the switching conveyor to normal position.

A further object is to provide an apparatus of the character referred to which is provided with control means whereby the destination of an article which has passed into the switch section will not be changed by the entrance of a following article of a different class into the switch section.

A further object is to provide a switching conveyor of the character just referred to which is further provided with means whereby the switch section will alter its position after preceding article has passed to its branch section so that the following article which has already entered the switch section may be transmitted to a different destination.

Other objects and advantages of the invention will become apparent during the course of the following description.

Figure 8:
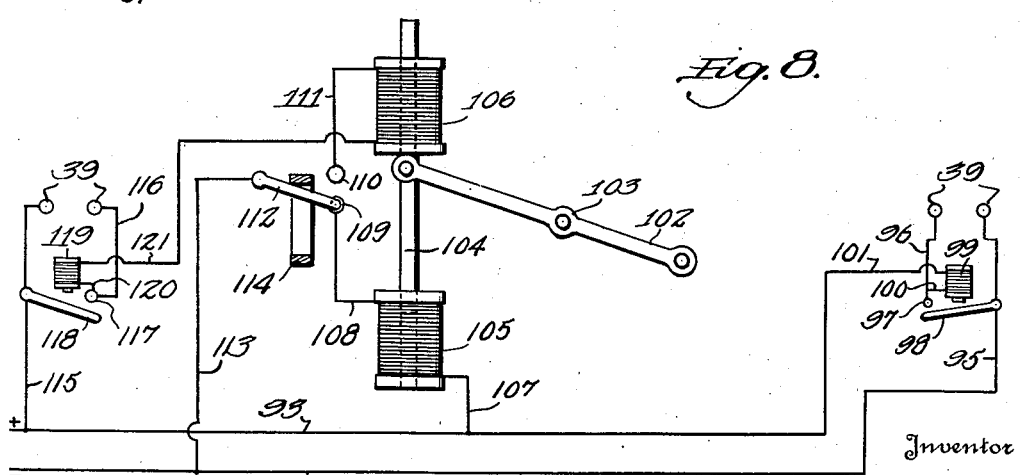

In the drawings we have shown several embodiments of the invention. In this showing, Figure 1 is a plan view, Figure 2 is a detail section on line 2—2 of Figure 1, Figure 3 is a vertical longitudinal sectional view, Figure 4 is a fragmentary face view of a portion of an article carrier and associated elements, Figure 5 is a section on line 5—5 of Figure 4, Figure 6 is a detail section on line 6—6 of Figure 3, Figure 7 is a diagrammatic view showing the electrical connections, Figure 8 is a similar view of a modified form of switch actuating means, Figure 9 is a diagrammatic view of the electrical system of a modified form of the invention, and, Figure 10 is a diagrammatic plan view of the modified form of conveyor system.

In the drawings, a switching conveyor of the type shown in the copending application of Carl W. Resch, Serial No. 359,897, above referred to, is illustrated. It will become apparent, however, that the present invention is not limited in its application to any specific type of switching conveyor.

Referring to Figures 1 to 7 of the drawings, the numeral 10 designates a main conveyor section including side rails 11 having conveyor rolls 12 journalled therebetween. The main conveyor is connected to a source of supply from which it is desired to convey articles to either of a plurality of destinations.

Referring to Figure 1, the numeral 13 designates a switch section as a whole including a straight section 14 and an alterable section 15. Structurally, the straight section 14 is similar to the usual gravity conveyors, such as the conveyor section 10, and includes side rails 16 having conveyor rollers 17 journalled therebetween.

The alterable section 15 includes a plurality of roller supports 18 each of which is provided with a conveyor roller 19 journalled between the ends thereof. Each roller support 18 has suitable connection with a laminated spring 20 whereby movement of the section 15 remote from the fixed conveyor section 10 causes the spring 20 to flex to an arc of a circle and to cause the supports 18 and their associated rollers 19 to assume radial positions as illustrated in Figure 1, the ends of the section 15, under all conditions, forming continuations of the sections 10 and 14, as will be apparent.

A tie rod 21 limits the movement of the support 18 remote from the conveyor section 10 to define the maximum length of the section 15, and inward movement of the end portions of the supports 18 toward each other is limited by lugs 22, carried by the individual supports 18. The supports 18 are slidable upon a lower plate 22', while movement of the conveyor section 14 to selected positions is facilitated by supporting wheels 23 which travel upon arcuate plates 24.

The end of the conveyor section 14 remote from the section 10 is adapted to be moved into alinement with either of a pair of branch conveyors indicated respectively by the numerals 25 and 26. Each of the branch conveyors includes side rails 27 having rollers 28 journalled therebetween, and since the conveyor 26 is arranged in alinement with the conveyor 10, the end of the former obviously is straight as illustrated in Figure 1. However, in order to arrange the inner end of the conveyor 25 in alinement with the section 14, the side rails of the conveyor 25 are curved in Figure 1 whereby the inner end of the conveyor 25 forms a continuation of the conveyor section 14 when the latter is in the position illustrated in Figure 1. As previously stated, the particular type of switching conveyor illustrated forms no part of the present invention, but is described and claimed in the copending application of Carl W. Resch, Serial No. 359,897, referred to above.

Any suitable means may be employed for effecting movement of the switch section to either of its selected positions, and either of such positions may constitute the normal position, as will be obvious. In the drawings, the normal position of the switch is shown as constituting a portion of a conveyor path which includes the conveyor sections 10, 14 and 25, but it will be apparent that the branch conveyor 26 may form a part of the normal path.

Referring to Figure 3, the numeral 29 designates a pair of transverse supports connected at their ends to the side rails 16, and adjacent the center of the switch section 14, the rails 29 are connected by a substantially T-shaped guide bar 30 (see Figure 2). The bar 30 is engaged by a guide 31 having a depending pivot pin 32 extending through an actuating block 33. A nut 34 may be threaded on the lower end of the pin 32, as shown in Figure 2.

Referring to Figures 1, 2 and 3, the numeral 35 designates a motor mounted upon a suitable support 36 extending beneath the free end of the switch section. A screw 37 is driven by the motor shaft and is threaded in the block 33, while the support 36 also carries a guide bar 38 slidable in the block 33, as shown in Figure 3. It will be apparent that the block 33 is adapted to partake of longitudinal movement with respect to the conveyor section 14, but is fixed against transverse movement with respect thereto. Any lateral forces applied to the guide member therefore will effect movement of the switch section to either of its two positions. It also will be apparent that the block 33 pivots about the axis of the pin 32, and accordingly this block retains its proper position with respect to the screw 37 and guide rod 38 under all conditions.

The main conveyor section 10 is provided near the end thereof with a pair of contact rollers 39 arranged adjacent and parallel to each other, as shown in Figure 5. Each of these rollers is supported upon a shaft 40 extending through insulating bushings 41 carried by the side rails 11. An insulating block 42 is secured against one of the rails 41 and carries a pair of brushes 43 contacting with the respective shafts 40. A pair of the rollers 39 also is carried by the branch section 26 adjacent the end thereof, and since these rollers are similar to the rollers 39 previously described, and are provided with the same electrical connections, they need not be referred to in detail.

Referring to Figures 4 and 5, the numeral 44 designates an article carrier preferably formed of wood or other insulating material. A pair of electrical conductors 45 and 46 is carried by the front wall 47 of the article carrier. The article carrier is further provided with a lower frame work 48 also formed of insulating material and the conductor 45 passes downwardly and beneath the forward portion of the frame 48 as indicated at 49. The conductor 46 extends over the top of the forward portion of the frame 48 as at 50, thence downwardly as at 51, to terminate in a horizontal foot 53 arranged rearwardly of and in the same plane as the foot 49 of the conductor 45.

The feet 49 and 53 are adapted to contact with the respective rollers 39 as the article carrier passes thereover, and means is provided for electrically connecting the conductors 45 and 46 for a purpose to be described. Referring to Figures 4 and 5, the numeral 54 designates a socket having its central portion bridging over and spaced from the upper ends of the conductors 45 and 46, and the ends of the socket are secured to the forward wall of the carrier 44 by suitable fastening elements 55. A key 56 is adapted to be arranged in the socket 54 to electrically connect the conductors 45 and 46, when desired, and the key is preferably provided with an upper handle portion 57 to facilitate the handling of the key and to limit its downward movement when in operative position in the socket 54.

In Figures 7 and 8, two electrical systems adapted for use in connection with the apparatus have been illustrated. Referring to Figure 7, the numeral 59 designates the armature of the motor 36, and the numeral 60 designates the field coils of the motor, the latter being connected to each other by a wire 61. A reversing switch 62 is adapted to control the motor and supplies current to the armature and field thereof through wires 63 and 64 respectively.

The reversing switch is operative in the usual manner by swinging an operating arm 65 connected thereto and constituting a magnet armature to be described. Movement of the arm 65 in one direction is adapted to cause rotation of the motor shaft in one direction, while movement of the arm 65 in the other direction reverses the polarity of the motor so as to rotate the shaft thereof in the opposite direction.

A pair of line wires 66 and 67 is connected to a suitable source of power, and these wires are connected to the reversing switch 62 by wires 68 and 69. The wire 67 is connected by a wire 70 to one of the contact rollers 39 of the conveyor section 10, the other contact roller 39 of this pair being connected to a stationary contact 71 by a wire 72. The contact 71 is adapted to be engaged by the armature 73 of a magnet 74, one end of which is connected to the wire 72 by a lead wire 75. As shown, the armature 73 is electrically connected to the wire 70.

The other end of the coil of the magnet 74 is adapted to be connected by a wire 76 to one end of the coil of a magnet 77, which is adapted to be energized in a manner to be described, to attract the arm 65 to one of its operative positions. The other end of the coil of the magnet 77 is connected by a wire 78 to a contact 79 adapted to be engaged by a switch 80. This switch is connected to the wire 66 by a wire 81. The arm 65 is adapted to be attracted to its other operative position through energization of another electro-magnet 82, one end of which is connected by a wire 83 to a second contact 84 associated with the switch arm 80. A yoke 85 is carried by any suitable part of the conveyor switch so that as the latter reaches either limit of its movement, it swings the switch arm 80 from the contact 79 to the contact 84, or vice versa.

One of the rollers 39 of the pair associated with the switch section 26 is connected by a wire 86 to the line wire 67. The other roller 39 of this pair is connected by a wire 87 to a stationary contact 88 adapted to be engaged by the armature 89 of an electro-magnet 90. One end of the coil of the armature 90 is connected by a wire 91 to the wire 87 while the other end of this coil is connected by a wire 92 to the other end of the coil of the magnet 82.

In Figure 8 of the drawings, a modified form of electrical control means is illustrated. As shown, a pair of line wires 93 and 94 is provided for connection with a suitable source of current, and the wire 94 is connected by a wire 95 to one of the contact rollers 39 associated with the conveyor section 10.

The other roller 39 of this pair is connected by a wire 96 to a stationary contact 97 adapted to be engaged by an armature 98 associated with an electro-magnet 99. The armature 98 is connected to the wire 95, as shown, while one end of the coil of the magnet 99 is connected to the wire 96 by a lead wire 100. The other end of the coil of the magnet 99 is connected by a wire 101 to the other line wire 93.

In the form of the apparatus illustrated in Figure 8, operation of the switch 13 is adapted to be effected by means of a suitable lever 102 pivotally supported intermediate its ends as at 103. The inner end of this lever is connected to an armature bar 104 magnetically associated with a pair of solenoids 105 and 106. It will be apparent that energization of either solenoid is adapted to effect movement of the armature 104, which is transmitted to the lever 102, and thence in any suitable manner to the switch section 13.

One end of the coil of the solenoid 105 is connected by a wire 107 to the line wire 93. The other end of the coil of the solenoid is connected by a wire 108 to a stationary contact 109. A second stationary contact 110 is connected by a wire 111 to one end of the solenoid 106. A switch arm 112, connected to the line wire 93 by a wire 113, is adapted to be automatically moved into engagement with the contacts 109 and 110, by means of a yoke 114, similar to the yoke 85 previously described, and connected at any suitable point to the conveyor switch 13.

One of the contact rollers 39 of the switch section 26 is connected to the line wire 93 by a wire 115. The other roller 39 of this pair is connected by a wire 116 to a stationary contact 117 adapted to be engaged by the armature 118 of an electro-magnet 119. The armature 118 is electrically connected to the wire 115, while one end of the coil of the magnet 119 is connected to the contact 117 by a wire 120. The other end of the coil of the member 119 is connected by a wire 121 to the other end of the coil of the solenoid 106.

The form of the invention previously described is efficient in operation in connection with systems wherein the traffic of the articles traveling over the conveyor is not heavy, that is, where the articles are spaced apart on the conveyor a distance greater than the length of the switch section. It has been found, however, that the operation of such system is disadvantageous for carrying heavy traffic where articles of different characters follow closely one behind the other. Accordingly, we have illustrated in Figures 9 and 10 a modified form of system which is adapted to convey articles of different characters to their proper destinations when such articles travel close together on the conveyor.

For example, the system illustrated in Figures 9 and 10 is of such character that if an unkeyed package enters the switch section, with the switch in the position shown in Figure 10, and a keyed package follows the unkeyed package before the latter passes off to its proper branch section, there will be no movement of the switch section until after the unkeyed package has passed to its proper branch conveyor, whereupon the switch will automatically swing to the other position to properly dispose of the keyed article.

Referring to Figure 10, the numeral 122 designates a main conveyor as a whole including side frames 123 between which are journalled rollers 124. A pair of these rollers such as the rollers 125 and 125', are contact rollers which are adapted to control certain electrical circuits for a purpose to be described.

A flexible switch section 126 is connected at one end to the end of the main conveyor 122, and the switch section also includes a plurality of rollers 127. The free end of the switch section is adapted to swing into alinement with either of a pair of branch sections 128 or 129, these branch sections similarly including side rails 130 having rollers 131' journalled therebetween.

The branch sections 128 and 129 are provided with contact rollers 130 and 131 respectively, these rollers being arranged close to the entrances of the switch sections as shown in Figure 10. A coacting contact roller 132 is carried by the switch section close to the extremity of the free end thereof, and the contact rollers 130, 131 and 132 are adapted to perform certain functions in connection with the wiring system to be described.

A motor to be referred to is adapted to effect movement of the free end of the switch section 126 to either of its two positions in alinement with the branch conveyors 128 and 129. Such motor is controlled by a limit switch 133 which stops the motor when the switch section is arranged in alinement with the branch conveyor 129, and a second limit switch 134 is adapted to stop the motor when the switch section is connected to the branch 128.

The roller 125 is mounted to move vertically to a limited extent, and in Figure 9 of the drawings this roller is shown diagrammatically as being connected by a pivoted lever 135 to a link 136 which in turn is connected to a pivoted switch arm 137. This switch arm is normally in the position shown in Figure 9 whereby its ends contact respectively with a pair of circumferentially arranged contacts 138 and 139, while depression of the roller 125 is adapted to swing the switch arm 137 into engagement with a pair of similarly arranged contacts 140 and 141. The contact 141 is directly connected by the wire 142 to the roller 125, while the contact 138 is connected to a wire 143 which, in turn, is connected by a branch wire 144 to the roller 125'. The contact 139 is connected to one end of a wire 145 to be referred to later.

The roller 125' is also depressible and is mechanically connected by a lever 146 and link 147 to a pivoted switch arm 148. The latter switch arm does not normally engage any contacts, but upon depression of the roller 125' is adapted to swing about its pivot to engage the contacts 149 and 150. The latter contact is connected to the wire 143, as shown, while the contact 149 is connected to a lead wire 151, to be referred to later.

The roller 132, carried by the free end of the switch section 126, is connected by a lever 152 and a link 153 to a switch arm 154 which is normally arranged in the position shown in Figure 9. Thus this arm normally engages a pair of contacts 155 and 156, but is adapted to be depressed by an article passing thereover to break the circuit between the contacts 155 and 156. The wire 151 is connected to the contact 156, while the contact 155 is connected to one end of a lead wire 157.

The roller 132 as shown diagrammatically in Figure 9 is arranged adjacent the roller 130, that is, with the switch section 126 arranged in alinement with the branch conveyor 128. It will be apparent that when the switch section is arranged in alinement with the branch conveyor 129, the roller 132 will be arranged adjacent the roller 131. The rollers 130, 131 and 132 are all depressible, as in the case of the rollers 125 and 125'. The roller 130 is connected by a lever 158 and link 159 to a switch arm 160, which normally does not engage any contacts, but which is adapted to swing about its pivot upon depression of the roller 130, to engage a pair of contacts 161 and 162, the latter of which is connected to the wire 157.

The roller 131 is connected by a lever 163 and link 164 to a switch arm 165 which normally does not engage any contacts, but is adapted to be swung about its pivot upon depression of the roller 131 by an article passing thereover to engage a pair of contacts 166 and 167, the latter of which is connected by a wire 168 to the wire 157.

Aside from the current for operating the motor, to be described, which moves the switch section 126, the current for operating the system is preferably derived from a 110 volt source (not shown) to which is connected lead wires 169 and 170. The lead wire 169 is connected by a branch wire 171 to the wire 151, and also is adapted to supply current to other circuits to be described. The lead wire 170 is connected to one of the contacts 172 of the limit switch 133, the other contact 173 of this switch being connected to a wire 174. A switch member 175, forming a part of the limit switch 133, normally engages the contacts 172 and 173, and this switch is adapted to be opened when the conveyor switch 126 reaches a position in alinement with the branch conveyor 129.

The numeral 176 designates a recording switch as a whole, and this switch is fully disclosed in the pending application of Robert Haley and Allen E. Crady for conveyors, Serial No. 352,518, filed April 4th, 1929. Accordingly a detailed description of the recording switch is unnecessary in the present application. The recording switch includes a pair of parallel disks 177 and 178 which respectively carry contacts 179 and 180, and under normal conditions, these contacts are in engagement with each other. Magnets or solenoids 181 and 182 are respectively connected to the disks 177 and 178 whereby energization of either magnet is adapted to advance the corresponding disk one step in a given direction. Accordingly, if the magnet 181 is energized the contact 179 will be advanced one step beyond the contact 180, and the circuit across these contacts cannot be subsequently closed until the magnet 182 is energized to advance the disk 178 to bring its contact 180 into engagement with the contact 179. One end of the coil of the magnet 181 is connected to the line wire 170 by a lead wire 183, while a similar lead wire 184 connects one end of the winding of magnet 182 to the line wire 170.

The other end of the coil of magnet 181 is connected to one end of a wire 185, while the other end of the coil of magnet 182 is connected to one end of a wire 186. The other end of the latter wire is connected to the contact 161, as shown. The contacts 179 and 180 are connected respectively to wires 187 and 188.

The other end of the wire 187 is connected to one end of the coil of a solenoid 189, and energization of this solenoid is adapted to move a pair of switch arms 190 into engagement with contacts 191 and 192. The contact 191 is connected to the wire 187, while the two switch arms 190 are connected by a wire 193 to a solenoid 194, the latter forming part of a reversing switch indicated as a whole by the numeral 195. The opposite end of the solenoid winding 189 is connected by a wire 195' to the line wire 170.

The wire 188, leading from the contact 180, is connected to a wire 196 which leads to a stationary contact 197. A similar contact 198 is arranged adjacent the contact 197, and these contacts are adapted to be engaged by switch arms 199 and 200 respectively. The switch arms just referred to are normally in open position, as shown, and are adapted to be moved to closed position upon energization of a solenoid 201. The wire 174 leading from the contact 173 of the limit switch 133 is connected to one end of the coil of the solenoid 201, while the opposite end of this coil is connected to a lead wire 202. The contact 198 is connected to the wire 202 by a connecting wire 203. The wire 196, connected to the contact 197, is also connected to the stationary contact 192 by a lead wire 204.

The numeral 205 designates a solenoid adapted to attract a switch arm 206 into engagement with a contact 207, and the switch arm is normally open as shown. One end of the coil of the solenoid 205 is connected by a wire 208 to the line wire 170, while the opposite end of the coil of solenoid 205 is connected to one end of a lead wire 209. One end of a wire 210 is connected to the stationary contact 140, and the wire 209 is tapped into the wire 210. The wire 202 is connected to the stationary contact 207, while the switch arm 206 is connected by a wire 211 to both of the switch arms 199 and 200. A lead wire 212 connects the wire 211 to the line wire 169.

A solenoid 213 is adapted to effect movement of a pair of switch arms 214 and 215, which are normally arranged in the position shown, the switch arm 214 being open while the switch arm 215 is closed. The wire 185 leading from the solenoid 181 is connected to a contact 216 normally engaged by the switch arm 215, while the switch arm 214, is adapted upon energization of the solenoid 213, to be brought into engagement with a contact 217. The latter contact is connected to one end of a wire 218 the opposite end of which is tapped into the wire 143. The wire 210 is connected to one end of the winding of solenoid 213 by a wire 219, and the latter wire is connected to the switch arm 214 by a wire 220. The other end of the solenoid winding 213 is connected by a lead wire 221 to the line wire 170.

A wire 222 has one end tapped into the wire 185, and its opposite end connected to one end of the winding of a solenoid 223, the opposite end of this solenoid being connected by a wire 224 to the line wire 170. The solenoid 223 is adapted to move a normally open switch arm 225 into engagement with a contact 226 connected to one end of a wire 227. The switch arm 225 is connected to a wire 228, and a connecting wire 229 leads from the line wire 169 to the wire 228.

A solenoid winding 230 has one end connected by a wire 231 to the wire 227, which also leads to a stationary contact 232. The other end of the solenoid winding 230 is connected to a wire 233. A second contact 234 is arranged adjacent the contact 232, and these contacts are adapted to be engaged respectively by normally open switch arms 235 and 236. Both of the switch arms just referred to are connected to the wire 228, previously described.

The numeral 237 designates a recording switch similar in construction and operation to the recording switch 176 previously described. The recording switch 237 includes a pair of rotatable disks 238 and 239 which are adapted to be respectively advanced by a step by step movement through the energization of solenoids 240 and 241. The disks 238 and 239 are arranged face to face in parallel relation, and are provided respectively with contacts 242 and 243 which are normally in registration and in engagement with each other. Accordingly it will be apparent that energization of the solenoid 240 is adapted to advance the contact 242 one step beyond the contact 243, and that the latter contact is adapted to be advanced back into registration with contact 242 upon energization of the solenoid 241.

The winding of solenoid 241 is connected at one end to the contact 166 by a wire 244 and at its opposite end to the line wire 170 by a lead 245. One end of the winding of solenoid 240 is connected by a wire 246 to the line wire 170, while the opposite end of this winding is connected to the end of the wire 210, as shown.

The numeral 247 designates a solenoid adapted to operate a pair of normally open switch arms 248 and 249 respectively and these switch arms are adapted to be respectively brought into engagement with stationary contacts 250 and 251. A wire 252 connects the disk contact 242 to the stationary contact 251, and a wire 253 is tapped into the wire 252 for connection with the contact 234.

Both of the switch arms 248 and 249 are connected by a wire 254 to one end of the winding of a magnet 255, arranged in alinement with the magnet 194, which forms a part of the reversing switch. A common wire 256 connects the ends of the windings of the magnets 194 and 255, and this wire is connected to the line wire 170 by a lead 257. A reversing switch mechanism (not shown) is arranged within a switch box 258, and the operation of the switch is accomplished through energization of either of the magnets 194 or 255 to swing a switch operating arm 259. The motor for effecting movement of the conveyor switch section is not shown, but it will be apparent that it operates in a manner similar to the operation of the motor shown in the previously described forms of the apparatus. The motor is preferably supplied with current from a 440 volt 3 phase power input line represented by the wires 260, and wires 261 lead from the reversing switch to the motor.

A wire 262 is connected at one end to the contact 243 of disk 239, and at its opposite end to one end of the winding of solenoid 247. A lead wire 263 is connected between the contact 250 and the wire 262. The other end of the winding of solenoid 247 is connected by a wire 264 to the line wire 170.

The limit switch 134 is similar in construction to the limit switch 133, and it will be apparent that it is normally closed except when the conveyor switch section is arranged in alinement with the branch conveyor 128. The limit switch includes a pair of contacts 265 and 266, the latter of which is connected by a wire 267 to the line wire 170. The contact 265 is connected to the wire 233, leading from the solenoid 230. A switch bar 268 forms a part of the limit switch and normally engages the contacts 265 and 266.

The operation of the form of the apparatus shown in Figures 1 to 7 inclusive is as follows:

Either of the branch conveyors 26 or 27 may constitute a portion of the normal path of the conveyor as a whole, the normal path preferably being determined according to the number of articles normally conveyed to the two branch tracks. In others words, the branch track which carries the preponderance of articles is preferably selected as the normal path, and in the present instance, the branch conveyor 25 is illustrated as forming a part of the normal conveyor path.

Articles which are intended to follow the normal path may be loaded in the carrier 44, or may be placed directly upon the conveyor 10 at the inlet end thereof. When the carrier 44 is employed, the key 57 is omitted, and consequently, when the carrier, or articles traveling directly upon the conveyor, reaches a point over the contact rolls 39 of the conveyor 10, the circuit will not be completed between these rolls, and no movement of the switch will take place. Accordingly the articles will continue to move from the section 10, through the switch 13, and thence along the branch 25 to be delivered thereby to the normal discharge point.

When it is desired to convey articles to the discharge end of the branch 26, the articles are placed in the carrier 44, and the key 56 is inserted in operative position, as shown in Figure 5. Accordingly when the carrier reaches a certain position with respect to the contact rolls 39, these rolls will respectively engage the contact feet 49 and 53, and current will be transmitted between the conductors 45 and 46 through the medium of the key 56.

Under the conditions stated, the motor 36 will start to operate. Referring to Figure 7, it will be seen that current from the source will flow through the line wire 67 and wire 70, and thence to one of the contact rolls 39, and this roll is electrically connected to the other roll 31 through the electrical path previously described. From the second contact roll 39, current flows to the magnet 74 through wires 72 and 75, and passing through the magnet, the current continues through wire 76, magnet 77 and wire 78, and thus to the stationary contact 79. The switch arm 80 normally engages the contact 79, and thus the current path will be complete through the arm 80, wires 81 and 66, and thence back to the source.

It will be apparent that the time interval during which the circuit is completed across the contact rolls 39 will be limited, while it requires an appreciable length of time to permit the conveyor to be moved from one position to the other. Accordingly means is provided for retaining the circuit referred to closed until the switch conveyor definitely reaches a point in alinement with the branch 26 regardless of the time interval during which the circuit is closed across the contact rollers 39. Referring to Figure 7, it will be apparent that completion of the circuit previously described causes the magnet 74 to be energized thus attracting its armature 73 into engagement with the stationary contact 71. Under such conditions, the current, instead of passing across the contact rollers 39, will flow through the armature 73, contact 71, and wires 72 and 75, and thence through the path previously described. Accordingly it will be apparent that the circuit will be held closed after the carrier 44 has passed beyond the contact rollers 39.

Under the electrical conditions referred to, the armature 65, constituting the actuating means for the switch 62, will be attracted by the magnet 77 and the switch 62 will be moved to one of its operative positions to rotate the motor shaft in one direction. Current is supplied to the motor from the source through the wires 68 and 69, which are connected respectively to the line wires 66 and 67, thence through the switch 62, and the respective wires 63 and 64.

Under the circumstances stated, the motor shaft will rotate to drive the screw 37 which, as stated, is threaded in the block 33. Movement of the block 33, effected by rotation of the screw 37, is transmitted to the guide 31 and bar 30, and thus to the swinging section 14, and the latter will move toward a position in alinement with the branch conveyor 26 as long as the motor circuit is closed. Obviously this circuit will remain closed until the circuit though the magnet 77 is broken.

The yoke 85 is connected to any suitable part of the switch to move therewith, or to be moved thereby, and when the switch 13 reaches a position nearly in alinement with the branch 26, one of the arms of the yoke 85 will contact with the switch arm 80 to move it out of engagement with the contact 79, and into engagement with the contact 84. Since the switch arm 80 forms a part of the circuit through the contact 77, movement of the arm away from the contact 79 obviously breaks the magnet circuit referred to, and the switch arm 65 will be released to return to normal position. Under the circumstances, it will be apparent also that the circuit through the magnet 74 also will be broken, and the armature 73 will drop thus preventing the magnet circuit from being again closed until another carrier 44, containing a key 56, passes over the rollers 39 of the section 10, and the circuit can be closed only when the switch arm 80 is in engagement with the contact 79. It will be apparent therefore that no further energization of the motor for moving the switch in the direction referred to can take place until the switch arm 80 is returned to engagement with the contact 79.

The carrier thus is permitted to proceed along the switch 13 and thence to the branch 26 to be delivered therefrom to the desired discharge point. It will be apparent that the carrier, in moving through the entrance end of the branch 26, will reach a point wherein the contact feet 49 and 53 will engage the contact rollers 39 of the branch 26, and these rollers will be electrically connected through the medium of the conductors 45 and 46, and the key 56. Under such circumstances, the motor will be reversed in a manner to be referred to, and the reverse rotation of the screw 37 will return the switch 13 to the normal position shown in Figure 1.

Referring to Figure 7, it will be noted that the closing of the circuit across the contact rollers 39 of the branch 26 causes the current to flow from the line wire 67 through wire 86, across the contact rollers 39, and thence through wires 87 and 91 to the magnet 90. After passing through this magnet, the current continues through wire 92, magnet 82, and wire 83 to the stationary contact 84. The switch arm 80 will have been previously moved into engagement with the contact 84, and thus the circuit to the line wire 60 and the source will be completed through the switch arm 80 and wire 81.

Obviously the completion of this circuit energizes the magnets 82 and 90, and the former operates to attract the arm 65, and thus operate the switch 62 to change the polarity of the motor 36 whereby the latter will return the switch 13 to normal position as above stated.

At the same time it will be apparent that energization of the magnet 90 will attract the armature 89 into engagement with the contact 88, and thus the circuit just described will remain completed through the armature 89, contact 88 and wire 87, and thence through the remainder of the circuit described. Thus after the carrier has passed beyond the contact rollers 39, the circuit will remain closed until the switch has returned to normal position, at which time the yoke 85 will operate to return the switch arm 80 to engagement with the contact 79, thus placing the magnet circuit first described in condition to be completed upon movement of a keyed carrier over the contact rollers 39 of the conveyor section 10.

From the foregoing it will be apparent that the present apparatus is fully automatic in operation, and is adapted to deliver articles selectively to a plurality of destinations by utilizing the articles themselves as means for completing electrical circuits for effecting operation of the switch whereby articles can be delivered along a path other than the normal path. It also will be apparent that the carrier apparatus in each instance will return the switch section to normal position automatically after the carrier has passed to the branch section 26.

The operation of the modified form of the apparatus illustrated in Figure 8 will be apparent from the foregoing description, and need not be referred to in detail. It will be apparent that closing the circuits across the contact rollers 39 will operate to energize the respective operating solenoids rather than the reversing switch previously referred to, and the switch section 13 will be moved in either direction according to the operating solenoid energized.

As previously stated, the form of the invention illustrated in Figures 9 and 10 is highly satisfactory in use where traffic on the conveyor is relatively heavy, so that articles often follow each other a distance apart less than the length of the conveyor switch section 126. Assuming that an unkeyed article has passed into the switch section 126 from the main conveyor 122, and a keyed article enters the switch section before the previous article has been discharged to the branch 128, it will be apparent that it is desirous to hold the parts in proper position to discharge the unkeyed article, and then to automatically move the switch section into alinement with the branch 129. The converse is similarly true, and as a matter of fact, there are a number of different operating conditions of the apparatus which will be referred to in order that the operation of the apparatus clearly may be understood. Accordingly a number of operating conditions will be described, and they will be taken up in the following order:

Condition No. 1: When a plain or unkeyed article enters the empty conveyor switch section.

Condition No. 2: When an unkeyed article leaves the empty conveyor switch section.

Condition No. 3: When a keyed article enters the conveyor switch section.

Condition No. 4: When a keyed article leaves the conveyor switch section.

Condition No. 5: When a keyed article enters the conveyor switch section with an unkeyed article on the switch.

Condition No. 6: When an unkeyed article enters the switch with a keyed article on the switch.

Condition No. 7: When an unkeyed article enters the switch while the latter is in motion.

Condition No. 8: When a keyed article enters the switch while the latter is in motion.

Condition No. 1

The differences between the classes of articles to be conveyed have been previously described, and in the following description, they will be referred to merely as "unkeyed articles" and "keyed articles". The second class of articles includes the keyed boxes illustrated in Figures 4 and 5, while the first class of articles includes all other articles which travel on the conveyor without effecting the closing of any circuits by virtue of any metallic keys or similar devices carried by the articles themselves.

Assuming that the conveyor switch is in the position shown in Figure 10, in alinement with the branch 128, it will be apparent that the apparatus is properly positioned to discharge unkeyed articles upon the branch 128, and that the limit switch 134 will be open. An article approaching the conveyor switch 126 from the main conveyor passes over the rolls 125 and 125' which are successively depressed and then released. In this connection, it will be apparent that the unkeyed article will not afford electrical connection between the rolls 125 and 125'.

The article initially depresses roll 125, thus swinging the switch 137 into engagement with the contacts 140 and 141, and no circuit will be closed, since the latter contact is connected only to the roll 125 which is electrically disengaged from the roll 125'. Further movement of the article then depresses the roll 125', at which time the switch arm 148 will swing into engagement with the contacts 149 and 150, but again no circuit will be closed by virtue of the fact that the contact 150 is connected to wire 143 which is open circuited in all of its connections.

The unkeyed article continues to move with respect to the depressible rollers referred to until the roller 125 will be released while the roller 125' will be momentarily held in depressed position. Under such conditions, the switch arm 137 will move back to the position shown in Figure 9, while the switch arm 148 will be momentarily held in engagement with the contacts 149 and 150. Under such conditions, two dependent circuits will be closed in the following manner; current will flow from line wire 169 through wires 171 and 151, and thence between the contacts 149 and 150 through the switch arm 148. From the contact 150, current flows through wire 143 to contact 143, through switch arm 137 to contact 139, and thence through wire 145 to the switch arm 215.

As previously stated, the switch arm 215 is normally in closed position, and thus current will flow through the switch arm to contact 216, and thence to wire 185 which is connected to the solenoid 181. The circuit through the solenoid to the line wire 170 is completed through wire 183, and thus connection between the contacts 179 and 180 of the recording switch will be broken through the advancement of the disk 177 in accordance with the operation described in the copending application Serial No. 352,518, previously referred to. Under the conditions stated, therefore, the contact 179 will be advanced one step beyond the contact 180, and electrical connection between these contacts can be reestablished only through energization of the solenoid 182 in a manner to be referred to.

The circuit up to and including the wire 185 has been previously traced. The wire 222 is tapped into the wire 185 and leads to one end of the winding of solenoid 223 which in turn is connected to the line wire 170 by wire 234. Thus the solenoid 223 will be energized to close the switch 226 to close a dependent circuit to be referred to, which will immediately open upon deenergization of the solenoid 223, or will remain closed, according to the conditions present, after the circuit through solenoid 223 is opened.

As stated, energization of solenoid 223 will close the switch 225, whereupon current will flow from the line wire 169 through wires 229 and 228 to the switch arm 225. With the latter element in closed position, current will continue through contact 226 and wires 227 and 231 to one end of the winding of solenoid 230, and thence from the solenoid through wire 233 to the contact 265. Under the assumed operating conditions present, the conveyor switch section 126 is connected to the branch 128, and thus the limit switch 134 will be open and the circuit thus traced will be broken at the limit switch. Accordingly the solenoid 230 will not be energized since its dependent circuit is only partially closed, and thus the apparatus will not be affected in any manner, and the switch section 126 will remain in alinement with the branch 128 to discharge the unkeyed article thereto.

Assuming that the switch section 126 had been arranged in alinement with the branch 129 when the unkeyed article entered the switch section, it will be apparent that the limit switch 134 would have been closed, and accordingly contact would have been established through the limit switch since the switch arm 268 would have been in engagement with the contacts 265 and 266. The latter contact is connected to the line wire 170 through wire 267. Under such conditions, the solenoid 230 will be energized to attract its armature and the switch arms 235 and 236 will be closed. The closing of the circuit in the manner referred to provides a stick circuit for the solenoid 230 whereby the unkeyed article can pass beyond both of the rollers 125 and 125' to break the circuit through solenoid 223 without affecting the solenoid 230.

Under the conditions referred to, current will flow from wire 228 to switch arm 235 and thence to its contact 232, and from this contact current flows through wires 227 and 231, through solenoid 230, through wire 233, thence across contacts 265 and 266 and through wire 267 to the line wire 170. The connection of the line wire 169 to the solenoid 230 through switch arm 235 affords a stick circuit for the solenoid 230 which will remain closed after the solenoid 223 is deenergized so long as the limit switch 134 remains closed.

Energization of the solenoid 230 also closes the switch arm 236 whereby current flows from line wire 169 through wires 229 and 228, switch 236 and contact 234, and thence through wires 253 and 252 to the contact 242 of the recording disk 238. At this point it may be stated that the contacts 242 and 243 are normally in registration with each other, and thus the current will flow across these contacts, and thence through wire 262 and solenoid 247 and back to the source through wires 264 and 170. Under such circumstances, the solenoid 247 will be energized to close the switch arms 248 and 249.

The wire 263 is connected to the wire 262, the circuit to which has been previously described. Accordingly the circuit will be closed to contact 250, and when the solenoid 247 is energized, current will flow from this contact through switch arm 248, through wire 254, magnet 255, wires 256 and 257 and thence back to the source through line wire 170. Energization of the magnet 255 attracts the switch operating arm 259, thus driving the motor in the proper direction to swing the switch section 126 from a position in alinement with the branch 129 to a position in connection with the branch 128. Current also will be supplied to the magnet 255 through wires 253 and 252, and thence through switch arm 249 and wire 254.

The motor will continue to operate so long as the magnet 255 is energized, which in turn, is dependent upon energization of the solenoids 230 and 247 to complete the circuits to the magnet 255. Similarly, energization of the solenoid 247 is dependent upon the energization of the solenoid 230 to retain the switch arms 235 and 236 in closed position. As soon as the switch 126 reaches a position in alinement with the branch conveyor 128, the limit switch 134 will be open, thus breaking the circuit through the solenoid 230. The switch arms 235 and 236 thus will return to open position, and the circuit through wires 252 and 253 will be broken, thus deenergizing the solenoid 247 to permit the magnet arms 248 and 249 to return to open position. Thus the magnet 255 will be deenergized, and the operating motor will cease to function.

Under the foregoing conditions, the operation of the conveyor switch control mechanism has been completed when an unkeyed package enters the switch with the latter in alinement with either of the two branches. If the switch was already in alinement with branch 128 it will be left in such position, while if the switch had been in alinement with the branch 129, it would have been moved into a position in alinement with the branch 128, and accordingly it will be apparent that unkeyed articles will be delivered to the latter branch.

*Condition No. 2*

As a result of the operating conditions referred to above, it will be apparent that the conveyor switch 126 will be arranged in alinement with the branch 128 at least before the unkeyed article is ready to pass to the latter. With the parts in the position referred to, the rollers 130 and 132 will be arranged adjacent and parallel to each other as indicated diagrammatically in both Figures 9 and 10. The unkeyed package thus will pass over the roller 132 to depress this element, whereupon the switch arm 154 will swing out of engagement with the contacts 155 and 156, thus preventing the closing of any circuits at this instant by virtue of movement of the article. Continued movement of the article brings it into position over the roller 130 which will be depressed to move the switch arm 160 into engagement with the contacts 161 and 162. Since the article is unkeyed, there will be no electrical connection between the rollers 130 and 132, and no electrical circuits can be closed for the further reason that the switch arm 154 has been moved to inoperative position.

As the article continues to move, it will release the roller 132 to permit the switch arm 154 to return to the normal position shown in Figure 9 while the roller 130 will be held momentarily depressed. Under such conditions, current from the line wire 169 will flow through wires 171 and 151, across contacts 156 and 155 through switch arm 154, through wire 157, and across contacts 162 and 161 through switch arm 160. Thus the current will flow through wire 186, and thence through the solenoid 182 of the recording switch 176, and back to the source through wire 184 and line wire 170. It will be recalled that when the unkeyed article entered the switch section, movement of the disk 177 was effected to advance the contact 179 one step beyond the contact 180, and as will be explained later, this operation had the effect of preventing a following keyed package from causing the switch section 126 from swinging to a position in alinement with the branch 129 until the previous unkeyed article had been discharged to the branch 128. In view of the closing of the circuit last referred to, the solenoid 182 will be energized, thus moving the contact 180 one step, and thus into engagement with the contact 179. All of the parts at this point in the operation of the apparatus will have been returned to normal position, and the unkeyed article will have been discharged to the branch 128 to be conveyed to its proper destination.

*Condition No. 3*

The operating conditions of the apparatus when a keyed article enters the switch section 126 when the latter is empty now will be considered. As previously stated, the normal positions of all of the various electrical parts of the apparatus are shown in Figure 9, except for the limit switches, one of which will be normally open depending upon the position of the switch section 126. Assuming that the conveyor switch is in alinement with the branch 129, it will be apparent that the limit switch 133 will be open, and such condition will be first considered.

The keyed article approaching the conveyor switch will first depress the roller 125, thus swinging the switch arm 137 into engagement with the contacts 140 and 141, at which instant no circuits will be closed for the reasons previously explained. As the article continues to move, however, it will depress the roller 125′, and during the period of movement of the article, the electrical key carried thereby will effect electrical connection between the rollers 125 and 125′.

Under the conditions just stated, current will flow from line wire 169 through wires 171 and 151, across contacts 149 and 150, through wires 143 and 144, across the rollers 125′ and 125, and thence through wire 142 and across contacts 141 and 140 to wire 210. The wire 219 is connected to the wire 210, and thus current will flow through solenoid 213 and thence back to the source through wires 221 and 170. The solenoid 213 thus will be energized, and the switch 214 will be closed while the switch 215 is opened. At this point, a stick circuit comes into operation to maintain the solenoid 213 energized after the previously referred to circuit is broken. The stick circuit leads from the wire 143, the circuit to which already has been traced, to wire 218, contact 217, through switch arm 214 and wire 220, to wire 219, and thence through solenoid 213 in the manner previously described. Attention is invited to the fact that the stick circuit referred to is dependent only on depression of the roller 125′ to retain the switch arm 148 in engagement with the contacts 149 and 150, and thus the solenoid 213 will remain energized until after the article has passed completely beyond both of the rollers 125 and 125′.

As previously stated, a circuit is closed through wire 210 when a keyed article passes over and electrically connects the rollers 125 and 125′. The wire 210 not only effects energization of solenoid 213, but also energizes solenoid 205, the circuit through this solenoid being completed through wires 209, 208, and line wire 170. Upon energization of the solenoid 205, the switch 206 will be closed, and thus a partial circuit will be completed from line wire 169 through wires 212 and 211, through switch arm 206 and contact 207, through wire 202, solenoid 201, wire 174, and thus to the contact 173 of the limit switch 133.

Under the condition now being considered, however, the limit switch 133 is open by virtue of the fact that the switch section 126 is in alinement with the branch 129, and accordingly the circuit cannot be closed through the limit switch to the line wire 170. Accordingly the solenoid 201 will not be energized. At this point it may be stated that energization of the solenoid 201 is adapted, through dependent circuits, to energize the reversing switch magnet 194 to swing the conveyor switch from the position shown in Figure 10 to a position in alinement with the branch 129, and since, under the conditions being considered, the switch section 126 is already in alinement with the branch 129, the limit switch 133 will be open, and the motor reversing switch will not be affected.

It was pointed out that the passage of an unkeyed article over the rollers 125 and 125′ would cause a circuit to be closed through solenoid 223, when the unkeyed package released the roller 125 and momentarily held the roller 125′ depressed, to operate through dependent circuits to energize the reversing switch magnet 255. However, it is necessary to prevent this action when a keyed package is passing over the rollers 125 and 125′. As previously stated, when electrical connection is established between the rollers 125 and 125′, with these rollers both depressed, a circuit will be established across the rollers referred to and their associated switches to the wire 210, and thence through wire 219, solenoid 213 and wire 221 and thence back to the source through line wire 170. This action energizes solenoid 213, closing the switch arm 214 and opening the switch arm 215. The closing of the switch arm 214, as previously stated, closes a stick circuit through solenoid 213, through the medium of wire 218, switch 214, wires 220 and 219, and thence through the solenoid 213 and associated connections. This stick circuit will remain closed so long as the roller 125' is depressed to retain its switch arm 148 in engagement with the contacts 149 and 150, to supply current to the wire 218. Accordingly when the roller 125 is released, the circuit previously described for energizing the solenoid 223 when an unkeyed package passes over the rollers 125 and 125' cannot be closed by virtue of the fact that the switch arm 215 will be held in open position. Thus the means for energizing the reversing switch magnet 255 will be rendered inoperative whenever a keyed article passes over the rollers 125 and 125'.

Under the operating conditions referred to, it will be apparent that the entrance of a keyed package into the switch section prevents operation of the reversing switch magnet 255 under any conditions, while the operation of the reversing switch magnet 194 will be prevented if the switch section 126 is already in alinement with the branch 129 whereby the limit switch 133 is held in open position.

The operating conditions of the apparatus when a keyed article enters the switch section 126 when the latter is empty and arranged in alinement with the branch 128 will now be considered. As previously stated, when the switch section 126 is in alinement with the branch 129, to which branch keyed articles are to be conveyed, the limit switch 133 is open, and energization of the solenoid 201 through the partial circuits traced therethrough will be prevented. When the switch section 126 is arranged in alinement with the branch 128, however, the limit switch 133 will be closed, and thus the passage of the keyed article over the rollers 125 and 125' will effect energization of the solenoid 205, and thus also of the solenoid 201, since movement of the switch 206 to closed position will close the circuit from line wire 169 through wires 212 and 211, switch 206 and contact 207, wire 202 and solenoid 201, and thus back to the source through wire 174, through the limit switch 133 and thence to the line wire 170.

Energization of the solenoid 201 closes the switches 199 and 200, whereupon the circuit to the solenoid 201 will be closed from wire 212 through wire 211, switch arm 200, contact 198, wire 203, and thence to the wire 202 and through the remainder of the circuit of solenoid 201 previously described. Accordingly energization of the solenoid 205 initially effects energization of solenoid 201, whereupon a stick circuit is provided for this solenoid through switch arm 200 and associated elements, thus retaining the solenoid 201 energized after the keyed article passes beyond the rollers 125 and 125' and thus deenergizes the solenoid 205.

When the solenoid 201 is energized, current will flow to wire 211 in the manner previously described, thence through switch arm 199, contact 197 and wire 196 to the contact 180 of disk 178. As previously stated, the contacts 179 and 180 remain in engagement with each other when a keyed article enters the switch section, and thus current will flow across these contacts to wire 187, thence through solenoid 189 and back to the source through wire 195' and line wire 170. Energization of the solenoid 189 causes the switch arm 190 to be moved to closed position in engagement with the contacts 191 and 192.

Under such conditions, current from the wire 187 not only will be supplied to the solenoid 189, but also to the contact 191, and thus through switch arm 190, wire 193 and reversing switch magnet 194, and thus back to the source through wires 256 and 257 and the line wire 170. Current also will be supplied to the wire 193 through wire 204, contact 192 and the corresponding switch arm 190.

Energization of the magnet 194 attracts the switch arm 259, thus operating the motor to swing the switch section 126 toward a position in alinement with the branch 129. The circuit to the magnet 194 is dependent upon energization of the solenoid 189, which in turn, is dependent upon energization of the solenoid 201. The latter solenoid is arranged in series with the contacts of the limit switch 133 and remains energized as long as the limit switch 133 is closed. As soon as the switch section 126 reaches a position in alinement with the branch 129, the limit switch 133 will be opened, thus breaking the circuit through and deenergizing the solenoid 201. The switch arms 199 and 200 will return to open position, thus breaking the circuit through solenoid 189, and the switch arms 190 will move to open position and the reversing switch magnet 194 will be deenergized The circuit to wire 210 when a keyed article closes the circuit across rollers 125 and 125' has been previously described. The wire 210 is connected not only to the solenoids 205 and 213, but also leads to the solenoid 240 of the recording switch 237, the solenoid referred to being connected to the line wire 170 by the wire 246. Accordingly the passage of a keyed article over the rollers 125 and 125' has the effect, in addition to performing the functions previously described, of energizing the solenoid 240, thus advancing the contact 242 one step beyond the contact 243, thus preventing a following unkeyed package from closing a circuit across the contacts 242 and 243 to reverse the operation of the motor for controlling the switch section 126.

Condition No. 4

From the preceding discussion it will be apparent that when a keyed package enters the switch section 126 when the latter is empty and in alinement with the branch 129, it will remain in such position, while if the switch section is in alinement with the branch 128 it will be automatically moved to a position in alinement with the branch 129. The operating conditions when the keyed package moves from the switch section 126 to the branch section 129 now will be considered.

Under the conditions just referred to, the roller 132 at the end of the switch section will be arranged adjacent and parallel to the roller 131 at the entrance end of the branch 129. When the keyed package passes over the roller 132 the latter will be depressed, thus moving the switch 154 out of engagement with the contacts 155 and 156. The article next depresses the roller 131, thus swinging the switch arm 165 into engagement with the contacts 166 and 167. When the article then passes beyond the roller 132, and while it momentarily holds the roller 131 in depressed position, a circuit will be completed from the line wire 169 through wires 171 and 151, across the contacts 156 and 155, through wires 157 and 168, across contacts 167 and 166, through wire 244, and thence through solenoid 241 and wire 245 to the source through line wire 170.

As previously stated, the entrance of the keyed package into the switch section effects energization of the solenoid 240 to advance the disk 238, thus placing the contact 242 one step in advance of the contact 243. When the keyed article passes from the switch section 126 to the branch section 129, the solenoid 241 will be energized in the manner described, and the disk 239 will be advanced to bring the contacts 242 and 243 back into engagement with each other in order that the system may be operative to permit the motor to be reversed and thus swing the section 126 into alinement with the branch 128 upon the entrance into the switch section of an unkeyed article.

Condition No. 5

It is believed that the remaining conditions of operation will be readily understood from the foregoing description, and that they need not therefore be referred to in detail. As previously stated, the entrance of an unkeyed article into the empty switch section always has the effect of advancing the contact 179 of the recording switch 176 one step in advance of the contact 180. It has the further effect of swinging the switch section 126 into alinement with the branch 128 if the switch section was not already in such position. It already has been explained also that movement of the switch section 126 into a position in alinement with the branch 129 is dependent upon engagement between the contacts 179 and 180. It will be apparent therefore that so long as an unkeyed article is passing along the switch section 126, the contacts 179 and 180 will remain out of registration with each other thus preventing reverse movement of the switch section 126 until the unkeyed article is discharged therefrom.

Assuming that a keyed article approaches the switch section 126 while an unkeyed article is in the switch section and the latter is in registration with the branch 128, it will be apparent that the limit switch 133 will be closed. When electrical connection is effected between the rollers 125 and 125' by the passage of the keyed article thereover, the solenoid 205 will be energized, thus effecting energization of the solenoid 201 in the manner previously described and the solenoid 201 will remain energized after deenergization of the solenoid 205 due to the stick circuit provided for the solenoid 201 through the switch arm 200 and associated elements. The preceding unkeyed article, however, will have advanced the contact 179 one step beyond the contact 180, and thus the solenoid 189 cannot be energized. It follows therefore that the circuit cannot be completed to the reversing switch magnet 194, and the reversing switch will be unaffected. The only effect of the entering keyed package under such conditions will be to energize the solenoid 201, and deenergization of this solenoid can be accomplished only by the opening of the limit switch 133. Under the conditions described above, the keyed article is preceded by an unkeyed article, and the switch section 126 is in alinement with the branch 128, and thus the limit switch 133 will remain closed.

As previously described, the passage of the unkeyed article over the rollers 132 and 130 for discharge to the branch 128 completes the circuit through the solenoid 182, thus advancing the disk 178 to bring the contact 180 back into engagement with the contact 179. Since the solenoid 201 will have remained energized for the reasons stated, the solenoid 189 then will become energized to close the switch arms 190, whereupon the magnet 194 will be energized to reverse the motor and swing the switch section 126 into alinement with the branch 129 to discharge the keyed article thereupon.

Condition No. 6

When a keyed package enters the switch section while the latter is unoccupied, the switch section will remain in alinement with the branch 129, if already in such position, and will swing to this position if it is initially in a position in alinement with the branch 128. The entrance of the keyed article does not affect the recording switch 176, but it does affect the recording switch 237 by advancing the contact 242 one step beyond the contact 243. When the switch section 126 is in alinement with the branch 129, the limit switch 133 will be open, but the limit switch 134 will be closed, as will be understood.

If an unkeyed package enters the switch section under the conditions just referred to, the unkeyed article passes over the rollers 125 and 125′, the roller 125 being released while the roller 125′ is momentarily held depressed. Under such conditions, the solenoid 223 will be energized in the manner previously referred to, thus closing its switch 225 and effecting energization of the solenoid 230. The circuit through the solenoid 230 will be completed by virtue of the fact that the limit switch 134 is in closed position. The stick circuit for the solenoid 230, that is the circuit through wires 229, 228, and the switch arm 235 and associated elements will retain the solenoid 230 energized after deenergization of the solenoid 223. As previously stated, the circuit through the solenoid 230, when once closed, can be opened only upon movement of the limit switch 134 to open position. Under the conditions being considered, the switch section 126 is in alinement with the branch 129, and accordingly the limit switch 134 will remain closed.

The closing of the circuit through solenoid 230, under normal conditions, causes energization of the solenoid 247, and thus the magnet 255 to operate the motor reversing switch. However, energization of the solenoid 247 is dependent upon engagement between the contacts 242 and 243, and since the preceding keyed article will have stepped the contact 242 in advance of the contact 243, the reversing switch is rendered inoperative. The passage of the keyed article from the switch section to the branch 129, however, operates in the manner previously described to energize the solenoid 241 and thus advance the contact 243 into engagement with the contact 242, whereupon reversal of the motor will take place in the manner previously described.

At this point, the keyed article will have been discharged to the branch 129, and the following unkeyed article still will be arranged intermediate the ends of the switch section 126. The operation of the reversing switch 195 in the manner just described will swing the switching section 126 to a position in alinement with the branch 128 to discharge the unkeyed article thereto.

Condition No. 7

When a keyed article enters the switch section and is followed by an unkeyed article which enters the switch section while the latter is in motion toward a position in alinement with the branch 129, the conditions present are substantially the same as if the section 126 had reached a position in alinement with the branch 129. Under the conditions referred to, both of the limit switches will be closed, but the preceding keyed article will have advanced the contact 242 out of alinement with the contact 243, thus preventing energization of the magnet 255. During the swinging movement referred to, the magnet 194 will be energized, but will become deenergized as soon as the switch section reaches the desired position in alinement with the branch 129 and opens the limit switch 133. The passage of the keyed article then operates in the manner previously described to advance the contact 243 into engagement with the contact 242, whereupon the magnet 255 will be energized to reverse the motor.

As previously stated, energization of the reversing magnet 194, when a keyed package enters the switch, is dependent upon the registration of the recording switch contacts 179 and 180. When a keyed package is in the switch and an unkeyed package follows however, contact 179 is advanced one step beyond contact 180. This action however, will not deenergize solenoid 189 since initial energization of the latter closes the switch arms 190, and the previously described circuit to the contact 192 continues through switch arms 190, contact 191, and wire 187, and thence back to the source through wires 195′ and 170. Thus it will be apparent that the solenoid 189 is only initially dependent upon the contacts 179 and 180, and cannot subsequently be deenergized upon the entrance of an unkeyed article into the switch section.

Condition No. 8

When a keyed article enters the switch while the latter is in motion toward the branch 128 and an unkeyed article is arranged on the switch section, the conditions are the reverse of those just described. The entrance of the unkeyed article will have advanced the contact 179 of the recording switch 176, thus preventing energization of the magnet 194 of the reversing switch upon the entrance into the switch section of the keyed article. The magnet 255 will remain energized until the switch section reaches a position in alinement with the branch 128, whereupon it will be deenergized upon the opening of the limit switch 134. When the unkeyed article has passed over the rollers 132 and 130, the contact 180 again will be advanced into registration with the contact 179, whereupon the magnet 194 will be energized to swing the switch section into alinement with the branch 129 to discharge the keyed article thereto.

Energization of the solenoid 247 also is only initially dependent upon registration and engagement of the contacts 242 and 243, as is true in the case of the solenoid 189, as described in connection with the preceding condition. Once the unkeyed package has entered the switch to close the circuit through solenoid 247, a following keyed package entering the switch will advance contact 242 one step beyond contact 243. The wire 252, switch arms 248 and 249 and wire 263, however, comprise a stick circuit for the solenoid 247 to retain the latter energized after the following keyed article has advanced the contact 242. Thus the reversing magnet 255 will remain energized until the switch section 126 has reached a position in alinement with the branch conveyor 128.

It will be apparent that the form of the invention illustrated in Figures 9 and 10 is somewhat more involved than the forms of the invention illustrated in Figures 1 to 8 inclusive, but the parts required for its operation are relatively simple and cheap to manufacture, and the expense involved in the manufacture of the apparatus as a whole is not considerably greater than the cost of manufacturing the other forms of the apparatus. For general use therefore the form of the invention shown in Figures 9 and 10 is preferred inasmuch as it is thoroughly efficient in operation and is adapted to take care of relatively heavy traffic wherein the articles follow each other along the conveyor at relatively short intervals. The apparatus is fully automatic, and every possible condition of operation is taken care of in order that articles may be discharged without error at their proper destinations.

The various forms of the apparatus have been illustrated in connection with conveyors of the gravity type employing freely rotatable rollers, but it will be apparent that this form of conveyor has been selected merely for the purpose of illustrating the systems. The invention involved is not at all dependent upon its use in connection with gravity conveyors, since live roller conveyors may be employed throughout the system, or live rollers may be employed in parts of the system. For example, the rollers of the switch section which are arranged in fixed parallel relationship may be advantageously driven if desired, to facilitate the movement of the articles from the switch section to the branches, and thus speed up the operation of the system.

It is to be understood that the forms of the invention herewith shown and described are to be taken as preferred examples of the same and that various changes in the shape, size and arrangement of parts may be resorted to without departing from the spirit of the invention or the scope of the subjoined claims.

We claim:

1. Apparatus of the character described comprising a main conveyor, a pair of branch conveyors, a switch section connected at one end to said main conveyor and at its opposite end to one of said branch conveyors, a source of electrical power adapted to move the last named end of said switch section to a position in alinement with the other of said branch conveyors, circuit means for said source including a pair of contacts, and an article carrier movable over said contacts, and key means detachably supported by the carrier for completing a circuit across said contacts.

2. Apparatus of the character described comprising a main conveyor, a pair of branch conveyors, a switch section connected at one end to said main conveyor and adapted to be connected at its opposite end to one of said branch conveyors, a source of electrical power operative to swing the last named end of said switch section into alinement with the other branch conveyor, circuit means for said source including a pair of contact members arranged adjacent the junction of said main conveyor and said switch section, an article carrier, and detachable means adapted to be connected to said carrier to cause the latter to electrically connect said contact members to energize said source.

3. Apparatus of the character described comprising a main conveyor, a pair of branch conveyors, a switch section connected at one end to said main conveyor and adapted to be connected at its opposite end to one of said branch conveyors, a source of electrical power operative to swing the last named end of said switch section into alinement with the other branch conveyor, circuit means for said source including a pair of contact members arranged adjacent the junction of said main conveyor and said switch section, an article carrier, a pair of contact elements connected to said carrier and adapted to respectively engage said contact members as the article carrier passes along said main conveyor, and means adapted to be arranged across said contact elements to energize said source.

4. Apparatus of the character described comprising a main conveyor, a plurality of branch conveyors, a switch section having one end connected to said main conveyor, means having a portion forming a part of one of said conveyors and operative by one class of articles traveling from said main conveyor to said switch section for moving the other end of the latter into connection with one of said branch conveyors, and means operative by another class of articles for moving said switch section into contact with the other branch conveyor.

5. Apparatus of the character described comprising a main conveyor, a plurality of branch conveyors, a switch section having one end connected to said main conveyor, a source of power for effecting movement of the other end of said branch conveyor into positions connecting with said branch conveyors, means having a portion forming a part of one of said conveyors and operative by one class of articles traveling from said main conveyor to said switch section for moving the last named end of the latter into connection with one of said branch conveyors, and means operative by another class of articles for moving the last named end of said switch section into connection with the other branch conveyor.

6. Apparatus of the character described comprising a main conveyor, a plurality of branch conveyors, a switch section having one end connected to said main conveyor, means operative by one class of articles traveling from said main conveyor to said switch section for moving the other end of the latter into connection with one of said branch conveyors, means for rendering said last named means inoperative when said switch section is already connected to the last mentioned branch conveyor, means operative by another class of articles for moving said switch section into connection with the other branch conveyors, and means for rendering said last named means inoperative if the switch section is already connected to said last named branch conveyor.

7. Apparatus of the character described comprising a main conveyor, a pair of branch conveyors, a switch section having one end connected to said main conveyor, electrical means for effecting movement of the opposite end of said switch section selectively into contact with said branch conveyors, means operative by one class of articles passing along said main conveyor to said switch section for rendering said electrical means effective for moving said switch section to a position connected to one of said branch conveyors, means operative by said switch section upon reaching said last named position for rendering said electrical means inoperative, means operative by another class of articles for rendering said electrical means effective for moving said branch conveyor to a position connected to the other branch conveyor, and means operative by said switch section upon reaching said last named position for rendering said electrical means inoperative.

8. Apparatus constructed in accordance with claim 7 provided with means operative upon the entrance of an article of one class into said switch section for rendering said electrical means ineffective for changing the destination of said article upon the approach to said switch section of an article of the other class.

9. Apparatus constructed in accordance with claim 7 wherein said electrical means is provided with a plurality of control circuits, and means operative upon the entrance of an article of either class into said switch section for affecting said control circuits to render said electrical means ineffective for changing the destination of said article upon the approach to said switch section of an article of the other class.

10. Apparatus of the character described comprising a main conveyor, a switch section having one end connected to said main conveyor and its opposite end movable to either of two positions, means operative by an article of one class approaching said section from said main conveyor for moving the last named end of said switch section to one of its two positions if not already in such position, means operative by an article of another class for moving the last named end of said switch section to its other position if not already in such position, and means for preventing movement of said switch section when an article is traveling thereon until such article has been discharged from said switch section.

11. Apparatus of the character described comprising a conveyor including a main section and a switch section connected thereto at one end, a pair of branch conveyors, means for effecting movement of the other end of said switch section to selective positions in alinement with said branch conveyors, control means for said last named means arranged adjacent the junction of said main section and said switch section, said control means being operative by an article of one class for causing said first named means to effect movement of said switch section into alinement with one of said branch conveyors, and being operative by an article of another class for causing said first named means to effect movement of said switch section into alinement with the other branch conveyor, and means for preventing movement of said switch section when an article is traveling thereon until such article has been discharged to its proper branch conveyor.

12. Apparatus of the character described comprising a conveyor including a main section and a switch section connected thereto at one end, a pair of branch conveyor sections, an electrically operated power source for effecting movement of the other end of said switch section selectively into positions in alinement with said branch sections, control circuits for said power source operative by an article of one class for swinging said switch section to one position and by an article of another class for swinging said switch section to its other position, means operative upon the entrance of an article of one class into said switch section for rendering said control circuits inoperative for affecting said power source by a following article of a different class, and means operative upon the discharge of said first named article from said switch section for restoring said control circuits to normal condition to permit their operation by a following article of another class.

13. Apparatus constructed in accordance with claim 12 provided with means operative while an article of one class is in the switch section for recording the entrance thereinto of an article of the other class whereby the control circuit for the last mentioned class of articles will be rendered operative after such article has entered the switch section and upon the discharge therefrom of the preceding article.

14. Apparatus of the character described comprising a conveyor including a main section and a switch section connected thereto at one end and having its opposite end movable to either of two positions, a power source for effecting movement of the last named end of said switch section, a pair of control circuits for said source each including a recording switch, the closing of either control circuit being adapted to effect operation of said power source to move the last named end of said switch section to one of its respective positions, means operable by an article of either of two classes passing from said main section to said switch section for closing one of the respective control circuits and opening the recording switch associated with the other control circuit, means operative when the last named end of said switch section reaches the position determined by the closing of said last named control circuit for rendering said power source inoperative, and means operable by the article upon being discharged from said switch section for closing the previously opened recording switch to render the circuit associated therewith capable of operation by a following article of the other class.

15. Apparatus constructed in accordance with claim 14 wherein each control circuit is provided with a stick circuit whereby either control circuit will remain closed through its stick circuit while an article is passing through said switch section and upon the entrance thereinto of an article of the other class and upon the consequent opening of the recording switch associated with the control circuit of the preceding article.

16. Apparatus of the character described comprising a main conveyor, a plurality of branch conveyors, a switch section having one end connected to said main conveyor, means operative by one class of articles traveling from said main conveyor to said switch section for moving the other end of the latter into connection with one of said branch conveyors, means for rendering said last named means inoperative when said switch section is already connected to the last mentioned branch conveyor, means operative by another class of articles for moving said switch section into connection with the other branch conveyors, means for rendering said last named means inoperative if the switch section is already connected to said last named branch conveyor, and means operative when an article of one class is in said switch section for preventing movement thereof by a following article of another class.

17. Apparatus of the character described comprising a main conveyor, a switch section having one end connected to said main conveyor and its opposite end movable to either of two positions, means operative by an article of one class approaching said section from said main conveyor for moving the last named end of said switch section to one of its two positions if not already in such position, means operative by an article of another class for moving the last named end of said switch section to its other position if not already in such position, and means operative to prevent changing the destination of an article of one class traveling upon said switch section upon the entrance thereinto of an article of the other class.

18. Apparatus of the character described comprising a main conveyor, a pair of branch conveyors, a switch conveyor having a stationary end connected to said main conveyor and a movable end normally connected to one of said branch conveyors, means including a powder source for moving the last named end of said switch into connection with the other branch conveyor, means adapted to be controlled by an article passing along said main conveyor and said switch for actuating said last named means, and means operative when said switch is connected to the second named branch conveyor and an article is traveling over said switch for preventing movement thereof until such article has been discharged to said second named branch conveyor.

19. Apparatus of the character described comprising a conveyor including a main portion and a switch connected at one end to said main portion, a plurality of branch conveyors, electrical means operable by articles of different classes passing along said first named conveyor and said switch for determining the branch conveyor to which said switch shall be connected, and means for preventing movement of said switch while an article is traveling thereover until such article has been discharged to the selected branch conveyor.

In testimony whereof we affix our signatures.

HENRY R. GOTTHARDT.
WILLIAM E. CAIN.